US007366980B2

(12) United States Patent
Small

(10) Patent No.: US 7,366,980 B2
(45) Date of Patent: Apr. 29, 2008

(54) MULTIPLE OUTPUT DEVICE ASSOCIATION

(75) Inventor: Jeffrey W. Small, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 533 days.

(21) Appl. No.: 10/798,500

(22) Filed: Mar. 11, 2004

(65) Prior Publication Data

US 2004/0172589 A1  Sep. 2, 2004

Related U.S. Application Data

(62) Division of application No. 09/484,772, filed on Jan. 18, 2000.

(51) Int. Cl.
*G06F 15/00* (2006.01)
*G06F 17/00* (2006.01)

(52) U.S. Cl. .................. 715/517; 715/513; 715/525; 709/217; 700/192

(58) Field of Classification Search ............... 715/513, 715/517, 525; 709/217
See application file for complete search history.

(56) References Cited

U.S. PATENT DOCUMENTS

| 5,128,878 | A | * | 7/1992 | Gore et al. .................. 345/502 |
| 5,559,933 | A | | 9/1996 | Boswell |
| 5,619,624 | A | | 4/1997 | Schoenzeit et al. |
| 5,692,111 | A | * | 11/1997 | Marbry et al. ............. 358/1.15 |
| 5,745,762 | A | | 4/1998 | Celi, Jr. et al. |
| 5,911,776 | A | * | 6/1999 | Guck ......................... 709/217 |
| 5,982,996 | A | * | 11/1999 | Snyders ..................... 358/1.15 |
| 6,301,012 | B1 | | 10/2001 | White et al. |
| 6,449,052 | B1 | | 9/2002 | Sherer et al. |
| 6,515,756 | B1 | | 2/2003 | Mastie et al. |
| 6,606,165 | B1 | | 8/2003 | Barry et al. |
| 6,611,725 | B1 | * | 8/2003 | Harrison et al. ............. 700/98 |
| 6,717,686 | B1 | | 4/2004 | Farros et al. |

OTHER PUBLICATIONS

Spyglass Prism Concepts and Applications, 1997 Spyglass, Inc., pp. 1-8.*
Microsoft Word 97, Microsoft Corporation 1997, screenshots pp. 1-4.*

(Continued)

*Primary Examiner*—William L. Bashore
(74) *Attorney, Agent, or Firm*—Gates & Cooper LLP

(57) ABSTRACT

One or more embodiments of the invention enable a user to establish, configure, and associate one or more output devices with a file. Prior art applications provide for configuring an output device (e.g., a printer) on an application wide basis. Users often format a file or document based on an output device. Consequently, it is useful to associate an output device with a particular file or information. In graphics programs, a user may define a drawing (referred to as a model) with various layouts or views of the drawing. Each layout or view may be formatted for a particular output device. Consequently, one or more embodiments of the invention associate one or more files, layouts, or views with one or more output devices. Additionally, each output device may be configured for a particular file, layout, or view. One or more embodiments of the invention provide for the association of one or more output device configurations with one or more files, layouts, or views.

12 Claims, 11 Drawing Sheets

OTHER PUBLICATIONS

I/O ingenuity for the design office: a look at some of the interesting options available (CAD peripherals), Design Engineering (via ProQuest Direct), Toronto: Jun. 1995. vol. 41, Issue. 6, pp. 1-4.*

"Selecting a Printer", © 1998 SYBEX Inc., 1pp., http://msdn.microsoft.com/library/partbook/egvb6/selectingprinter.htm.

"Introducing the Printer Object", © 1998 SYBEX Inc., 2pp., http://msdn.microsoft.com/library/partbook/egv6/introducingprinterobject.htm.

"Printing from Applications", © 1998 SYBEX Inc., 1 pp., http://msdn.microsoft.com/library/partbook/egyb6/printingfromapplications.htm.

"Loading Device Names into a Combo Box", © 1998 SYBEX Inc., 1pp., http://msdn.microsoft.com/library/partbook/egvb6/loadingdevicenamesintocombobox.htm.

Flags Property (Print Dialog), © 1999 Microsoft Corporation, 3pp., http://msdn.microsoft.com/library/devprods/vs6/vbasic/cmdlg98/vbproflagsprint.htm.

"ComonDialog Control Constants", © 1999 Microsoft Corporation, 5pp., http://msdn.microsoft.com/library/devprods/vs6/vb.../vbidxcommondialogcontrolconstants.ht.

"Device Context", © 1999 Microsoft Corporation, 1pp., http://msdn.microsoft.com/library/devprods/vs6/vbasic/vbdef98/vbdefdevicecontext.htm.

"Printer Default Property", © 1999 Microsoft Corporation, 2pp. http://msdn.microsoft.com/library/devprods/vs6/vbasic/cmdlg98/vbproprinterdefault.htm.

"Showing the Printer Dialog Box", © 1998 SYBEX Inc., 3pp., http://msdn.microsoft.com/library/partbook/egvb6/showingprinterdialogbox.htm.

* cited by examiner

MULTIPLE OUTPUT DEVICE ASSOCIATION

This application is a divisional application of Ser. No. 09/484,772, filed on Jan. 18, 2000, for MULTIPLE OUTPUT DEVICE ASSOCIATION by Jeffrey W. Small.

BACKGROUND OF THE INVENTION

1. Field of the Invention

The present invention relates generally to output devices and configuring files for output, and in particular, to a method, apparatus, and article of manufacture for configuring and associating one or more files in the same application with multiple output devices or with multiple output device configurations.

2. Description of the Related Art

To utilize information stored on computers, users often need to output the information. For example, information may be plotted or printed on a plotter (e.g., the Designjet line of plotters manufactured by HP or the 8800 series plotters manufactured by Xerox Engineering Systems), printed on a black-and-white printer, transmitted to a fax machine using the computer's modem, emailed to another user on a computer network, etc. Each of the mechanisms utilized are referred to as output devices. In the above example, a plotter, a black-and-white printer, a modem, and a computer network are all output devices. Merely by changing an output device, the format of the same information may change. For example, one plotter may not be able to print in a certain margin space or with image quality, while another plotter can print in that margin space or with the image quality desired. As a result, the same document or file may print differently on two different printers.

Prior art computer applications only provide the ability to specify and configure a file for a single output device at any one time. Further, prior art applications require an explicit device change in order to set up and redirect the output to an alternate device. Thus, applications will not permit a user to configure one document to be plotted on one plotter and another document to be configured to plot on another plotter. Output devices cannot be specified or configured on a per document basis.

These problems may be better understood by describing applications, output devices, and the interaction between applications and output devices.

Applications

Computer software applications are and can be utilized for an infinite number of tasks. For example, some of the tasks that are performed by software applications include drawing and graphics design in two dimensional (2D) or three-dimensional (3D) space (e.g., computer aided design (CAD) software such as AutoCAD 2000 manufactured by the assignee of the present invention, AutoDesk), word processing, digital picture viewing and editing, accounting, email, time keeping and billing, internet browsing, etc. While the application controls the ability to perform the desired task, one or more drawings or files may be opened in an application where the actual work may be edited and stored. For example, in a word processing application, one or more documents may be opened for the user to edit, store, and output. In a CAD program, one or more drawings may be opened for the user to edit, store, and output.

In one or more applications, a user may define one or more layouts or views of a file. For example, in a CAD application, a user can create an image and then define various layouts or views of the image (e.g., four layouts/views of the same image, each layout/view having a different center point or scaling).

Output Devices

Output devices are used so that the user can transmit or view information. Output devices include plotters, computer monitors, printers, modems, personal digital assistants (PDAs), etc. Output devices are often connected to a computer using cables and controlled using software applications referred to as drivers. Thus, the drivers provide the ability for the computer to communicate and utilize the output device. Since each output device is different, each output device usually has a different driver to control it. For example, two different plotters usually have two different drivers to control the plotter's operations.

As a result of the differences in drivers, the format of a particular file may change depending on the output device utilized. For example, in word processing, one printer may print 60 lines per page while another printer only prints 58 lines per page. Thus, depending on the printer utilized, the same document will print up differently with more or less pages.

Further, an output device may be configured in various ways (e.g., to default print in landscape mode or to default print in portrait mode). Each configuration of the same output device can be stored, represented, and referenced in a computer (e.g., in a system list of output devices such as printers). Such representations permit a user to select an output device with a specific configuration from a list.

Interaction Between Applications and Output Devices

As described above, applications use output devices to utilize, transmit, and view information and files on a computer. In the prior art, while an application is open, the user may select a particular output device to be utilized for the application. The user can change the output device selection but the selection changes the output device for all files opened in the application. Additionally, whenever an existing file or new file is opened or created, the file's format is modified, if necessary, based on the application specified output device. Consequently, if a user opens a previously created file that the user had configured for one output device, but the application currently has another output device selected, the file's output format may change.

In many instances, a user may alter a file so that the output is in accordance with the user's specification. For example, a user may insert manual page breaks in a word processing document so that paragraphs do not split up or so that words match up with a drawing. However, if the output device is modified, the document's formatting or output will be different from what the user expected (e.g., the manual page break may fall in a different location causing only ½ or ¼ page of text in one or more spots). In another example, a user may enlarge a color drawing (in a CAD program) so that certain details can be viewed more clearly. However, if the output device (e.g., the plotter) is modified, the format or output of the drawing will be different from what the user expected (e.g., the edges of the drawing may not plot or the color may appear as black-and-white).

Thus, prior art products only allow one output device to be established at a time and require an explicit device change in order to set up and redirect the output to an alternate device. Consequently, although a user can specify a particular output device in an application, the user may still not obtain the output desired.

SUMMARY OF THE INVENTION

One or more embodiments of the invention enable a user to establish, configure, and associate one or more output device configurations with a file. Prior art applications provide for configuring an output device (e.g., a plotter) on an application wide basis. Users often format a file or document based on an output device. Consequently, it is useful to associate an output device with a particular file or information. In graphics programs, a user may define a drawing (referred to as a model) with various layouts or views of the drawing. Each layout or view may be formatted for a particular output device. Consequently, one or more embodiments of the invention associate one or more files, layouts, or views with one or more output devices. Additionally, each output device may be configured for a particular file, layout, or view. One or more embodiments of the invention provide for the association of one or more output device configurations with one or more files, layouts, or views. In accordance with one or more embodiments of the invention, a virtual configuration may be created/adjusted by the user regardless of whether the configuration represents an actual output device. Thereafter, when the user desires to utilize an output device, a search is performed to attempt to select an actual output device with a configuration that most closely resembles the virtual configuration.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for selecting and associating multiple output devices with one or more files, layouts, or views. A user selects a file, layout, or view. A dialog is displayed to the user enabling the user to select the output device such as a plotter or printer, and to configure the output device and page setup options to the user's specifications. Alternatively, the user selects/creates an output device configuration (referred to as a virtual configuration) regardless of whether an actual output device with the configuration exists or has been installed. The selected device(s) and settings are then associated with the file, layout, or view by storing some settings with the file, layout, or view and storing other settings with the output device reference (e.g., with the plotter driver or PC3 file (discussed below)).

Hardware and Software Environment

Figure 1:
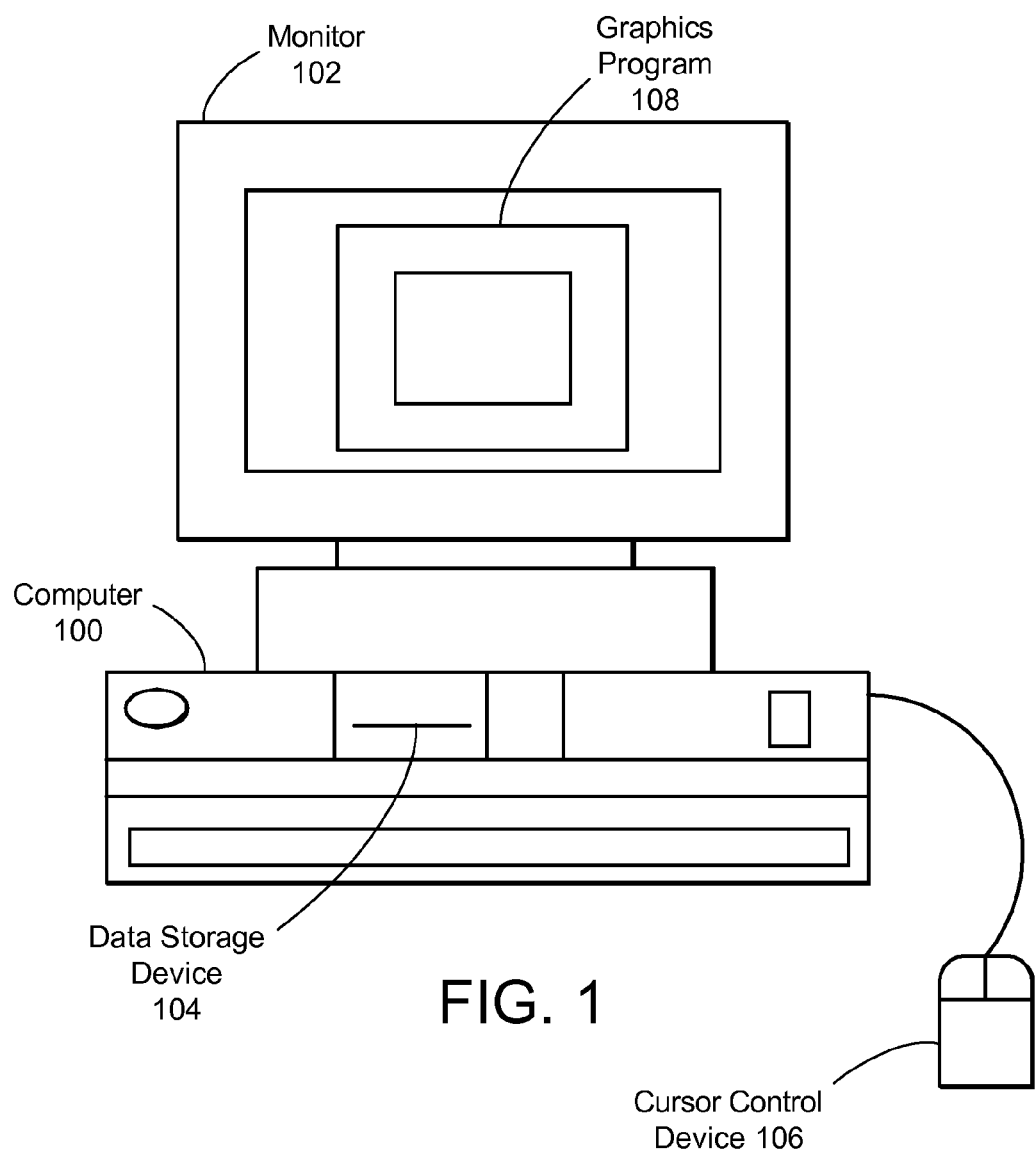
FIG. 1 is an exemplary hardware environment used to implement one or more embodiments of the invention.

FIG. 1 is an exemplary hardware and software environment used to implement one or more embodiments of the invention. One or more embodiments of the invention are typically implemented using a computer 100, which generally includes, inter alia, a monitor 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the monitor 102. Generally, the graphics program 108 comprises logic and/or data embodied in or readable from a device, media, or carrier, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiment

One or more embodiments of the invention enable a user to specify and configure a different output device (or output device configuration) for one or more files, layouts, or views. The specified output device and its configuration is then associated with the file, layout, or view. By associating the output device and its configuration with the file, layout, or view, a user does not need to reconfigure or re-specify the output device when another file, layout, or view specifies a different output device or when the default output device for the application is different.

Computer-Implemented Graphics Program Embodiment

Figure 2:
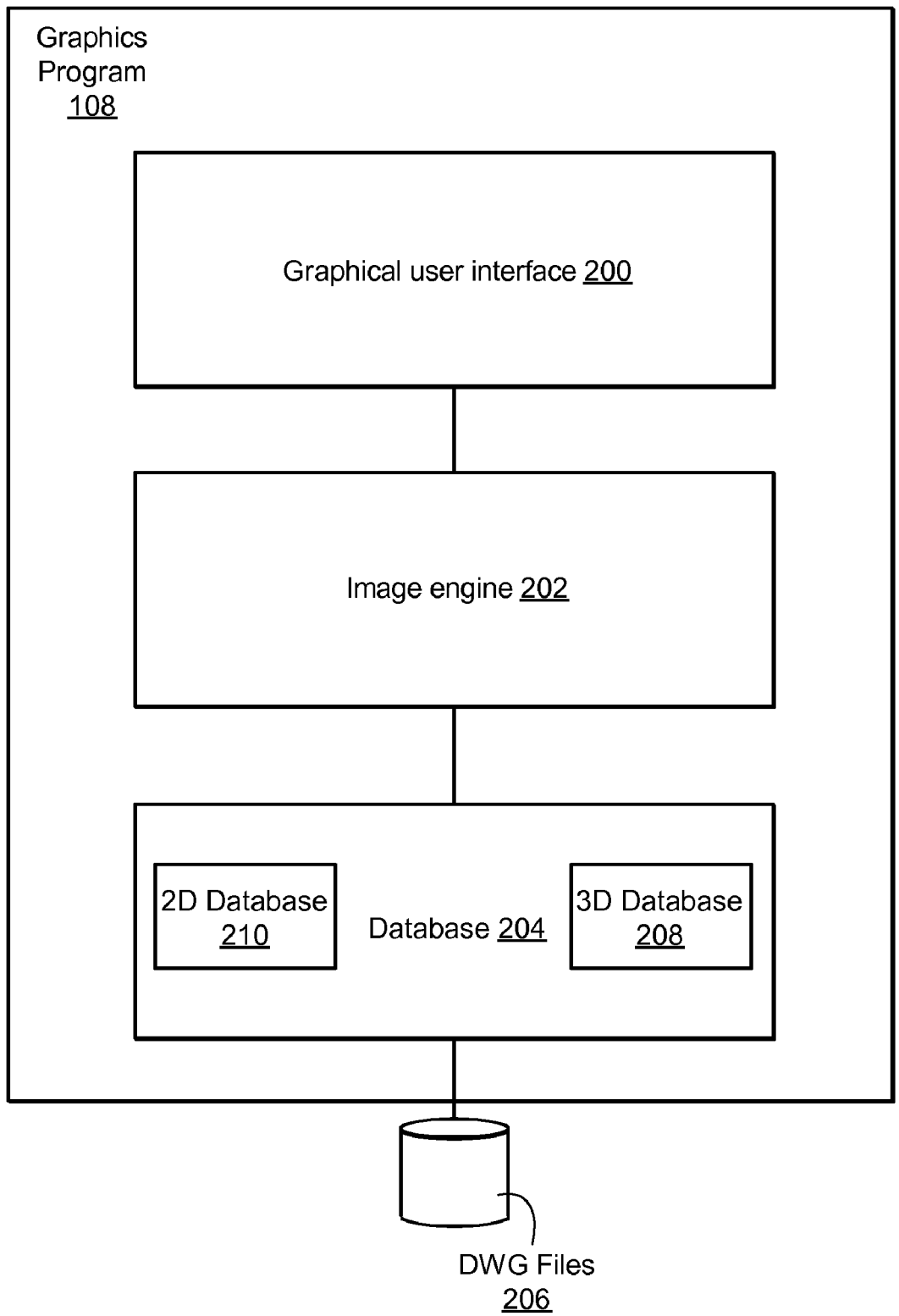
FIG. 2 is a block diagram that illustrates the components of the computer-implemented graphics program in accordance with one or more embodiments of the invention.

One or more embodiments of the invention are implemented in a graphics program such as the graphics program illustrated in FIG. 2. FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 102 for display. In the preferred embodiment, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that store 2D information derived from the 3D information.

Object List

Figure 3:
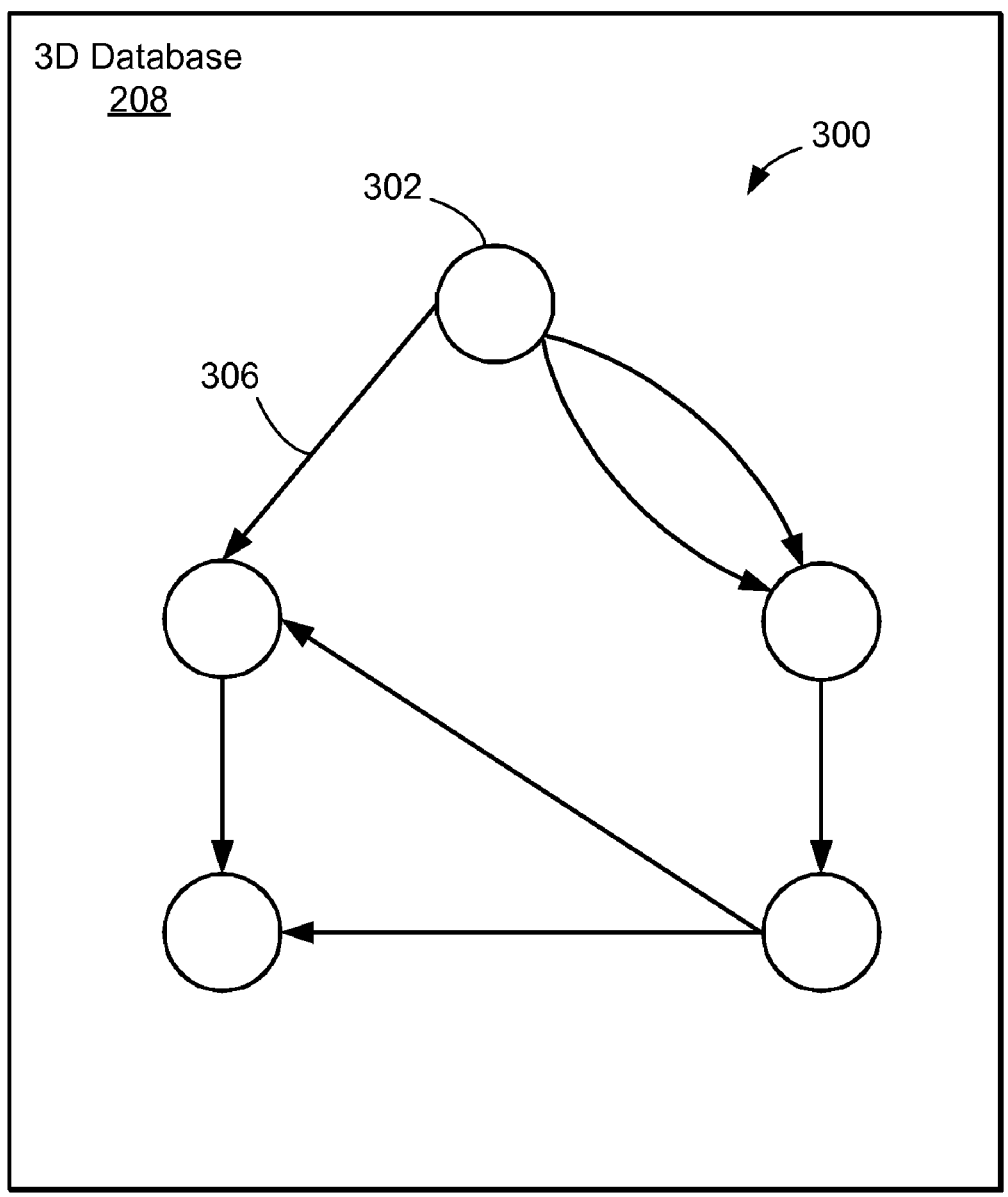
FIG. 3 is a block diagram that illustrates the structure of an object list maintained by each of the three-dimensional databases of the computer-implemented graphics program in accordance with one or more embodiments of the invention.

FIG. 3 is a block diagram that illustrates the structure of an object list 300 maintained by the 3D databases 208 according to one or more embodiments of the invention. The object list 300 is usually comprised of a doubly linked list having a list head 302 and one or more objects 304 interconnected by edges 306, although other structures may be used as well. There may be any number of different object lists 300 maintained by the 3D databases 208. Moreover, an object 304 may be a member of multiple object lists 300 in the 3D databases 308.

Details of Computer-Implemented Graphics Program Embodiment

As described above, one or more embodiments of the invention may be implemented in a computer graphics program. In one or more such embodiments, the concept of layouts may be utilized. Layouts provide a user interface for assisting a user in laying out drawings for printing. To create layouts, one or more embodiments of the invention utilize Model and Layout tabs. These tabs are similar to those found at the bottom of some existing products that allow users to move between "worksheets" or "documents". In one or more embodiments of the invention, these tabs will allow the user to move between the Model being worked on and one or more layouts of the Model arranged for plotting.

Layouts are designed to allow the user to easily compose a drawing and make it ready for hardcopy output. It gives the user an illusion of working on a "sheet" of paper with views into the model and provides visual clues that indicate the boundaries and margins (printable area) of the paper it is being plotted on. In addition, the layout can reflect the plot styles (for plotting or printing a drawing) assigned to objects as defined by plot style tables that may be associated with the useful objects (e.g., a layout object or viewport object). Thus, a user can compose several different layouts of the same drawing emphasizing different features in the drawing without having to duplicate geometry or redefine the properties of geometry.

In one or more embodiments, users create most of their drawings in the Model tab, then switch to a layout tab to define the views of the model they wish to print by creating "viewports" into the model. The drawing can be easily dimensioned and annotated while in the layout tab with the dimensions and annotation remaining in paper space. In one or more embodiments of the invention, viewport tools enable a user to scale the views of the geometry in the viewports, as well as give more control over what is displayed in a viewport.

Layout Properties

In one or more embodiments of the invention, layouts have options that apply to all of the layouts in the drawing as well as properties that are specific to each individual layout. General layout options may be controlled through a Display tab in an Options dialog. Specific layout properties may be controlled through the Page setup dialog. The following table shows the layout properties.

| Layout Options | Specific Layout Properties |
| --- | --- |
| Background (paper) color of Layout | Layout name |
| Pointer (crosshair) color | Page setup name |
| Display Model and Layout tabs | Plot style table name |
| Display paper background | Display plot styles |
| Display paper shadow | Plot device (PC3 file or windows printer) |
| Display margins | Paper size |
| Show Page setup dialog for new layout | Orientation (Portrait or Landscape) |
| Create a single viewport in new layout | Paper units (mm or inches) |
| | Plot area (Extents, Window, etc) |
| | Scale |
| | Plot Offset |
| | Print upside-down |
| | Plot with plot styles |
| | Plot paperspace last |
| | Hide lines |

In one or more embodiments of the invention, a Page setup dialog (discussed in detail below) allows the user to specify a plot device (PC3 file), paper size, orientation, layout name, and other parameters. A PC3 file is a reference to a plotter/printer and contains information about the plotter/printer and all of its settings, as well as the paper or other output media (as provided in the above table). Additionally, in accordance with one or more embodiments of the invention, PC3 files are drawing independent and may be shared among drawing program users. The Page setup dialog will contain default values and the default plot/print device (which can be set in an Options dialog). After the user enters new values or accepts the defaults and closes the dialog, one or more embodiments of the invention update the layout and insert a single viewport that is half the size of the margins and centered in the middle of the paper.

If not plotter/printer device is installed on the system, or if a user prefers to not install devices the user does not have while still being able to create a layout of a desired paper size, the user can select "None" as the plot device. The "None" plot device option is always available. When selected, the Paper size dropdown list will contain a comprehensive list of common paper sizes. Embodiments of the invention will assign an appropriate margin for the paper size (a default list of margins for each available paper size may be referenced). Since margins vary for the same paper size on different size, the user can manually configure the margins for the actual device the user is likely to eventually plot/print to. When the "None" plot device is assigned to a layout, pressing "OK" in a Plot dialog will display an alert to the user indicating that the "None" plot device has been selected and that nothing will be plotted.

After closing the Page setup dialog, the user will be looking at the layout with all the visual clues of working on a sheet of paper as well as seeing the model space geometry in paper space. The user can then proceed to adjust the viewport, add additional viewports, annotate the drawing, etc., and eventually print the drawing.

If a "None" device is selected and the user attempts to print/plot, embodiments of the invention approximates and selects the printer/plotter that most closely resembles the configured "None" device. A match is determined by media bounds (e.g., the boundaries specified for the "None" device such as margins) rather than printable bounds. In accordance with embodiments of the invention, a match is determined using the following criteria:

(1) Is there a match in a similar media group with the same orientation within ~5% tolerance?

(2) Is there a match in a similar media group with a rotated orientation up to the ~5% tolerance? and (3) If the layout's media group is unknown (as is the case with many system drivers), match to other media groups.

"Similar" as used above means media groups that use the same units of measurement (i.e., ANSI and Business are the same). Thus, if the user specified 8.5×11, but the printer only understands "Letter", not "8.5×11", the closest match would be "Letter." If the match fails, an alert dialog is displayed to the user and the layout paper size is set to the configured paper size for the newly selected PC3 file or system printer. For example, in accordance with one or more embodiments the following message may be displayed: "The paper size in the layout is not supported by the plot device you have selected. The layout will use the paper size specified by the plot device."

In one or more embodiments, whenever a new layout is created, or an uninitialized layout tab is activated for the first time in a drawing session, one or more embodiments of the invention display the Page setup dialog and automatically create a single viewport (unless this functionality is disabled by the Options settings). After a new layout has been made current for the first time, subsequent switching between the tabs merely makes the tab current.

Page Setup Dialog

Figure 4A:
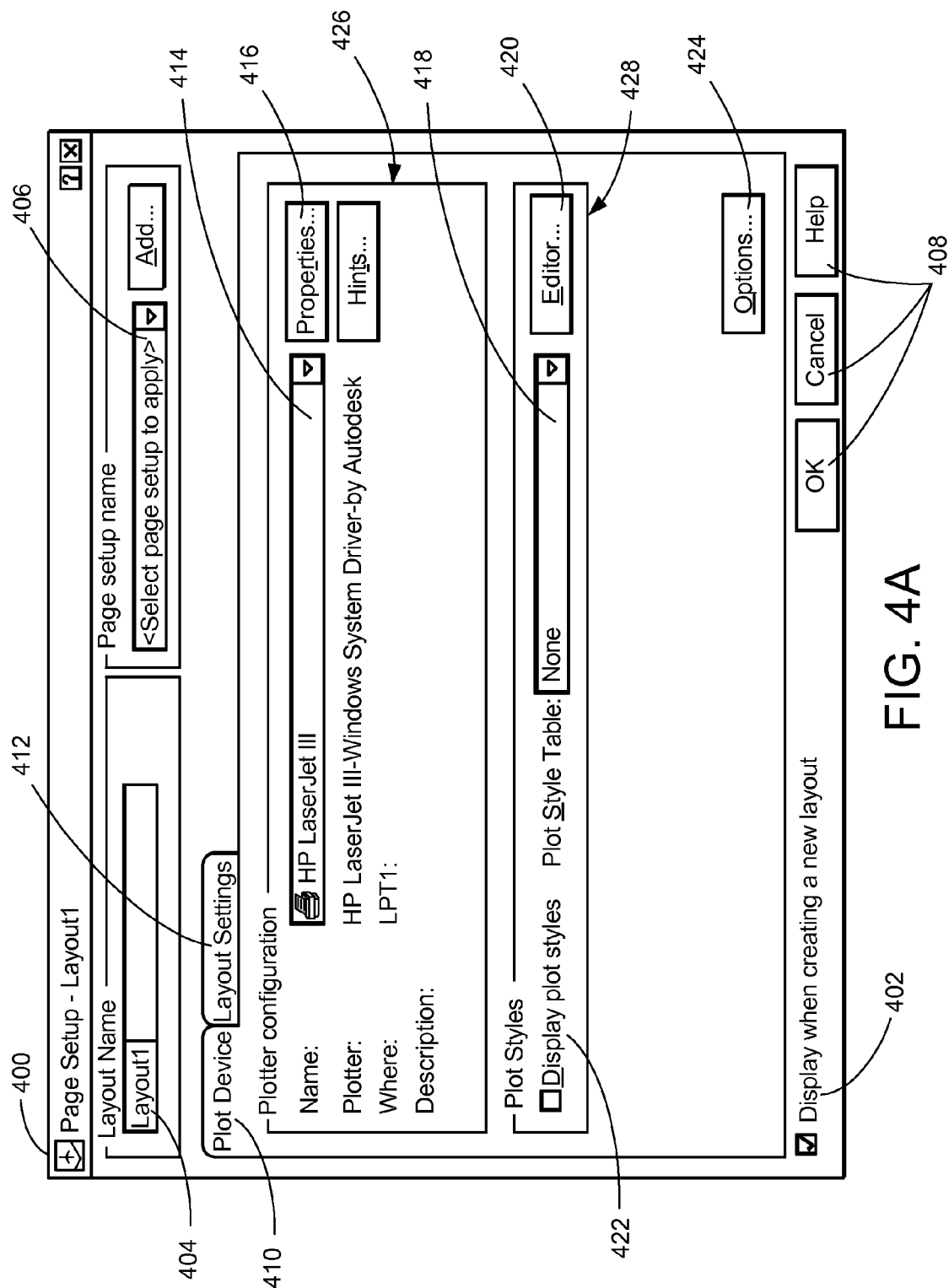
FIGS. 4A and 4B illustrate a Page setup dialog in accordance with one or more embodiments of the invention.
Figure 4B:
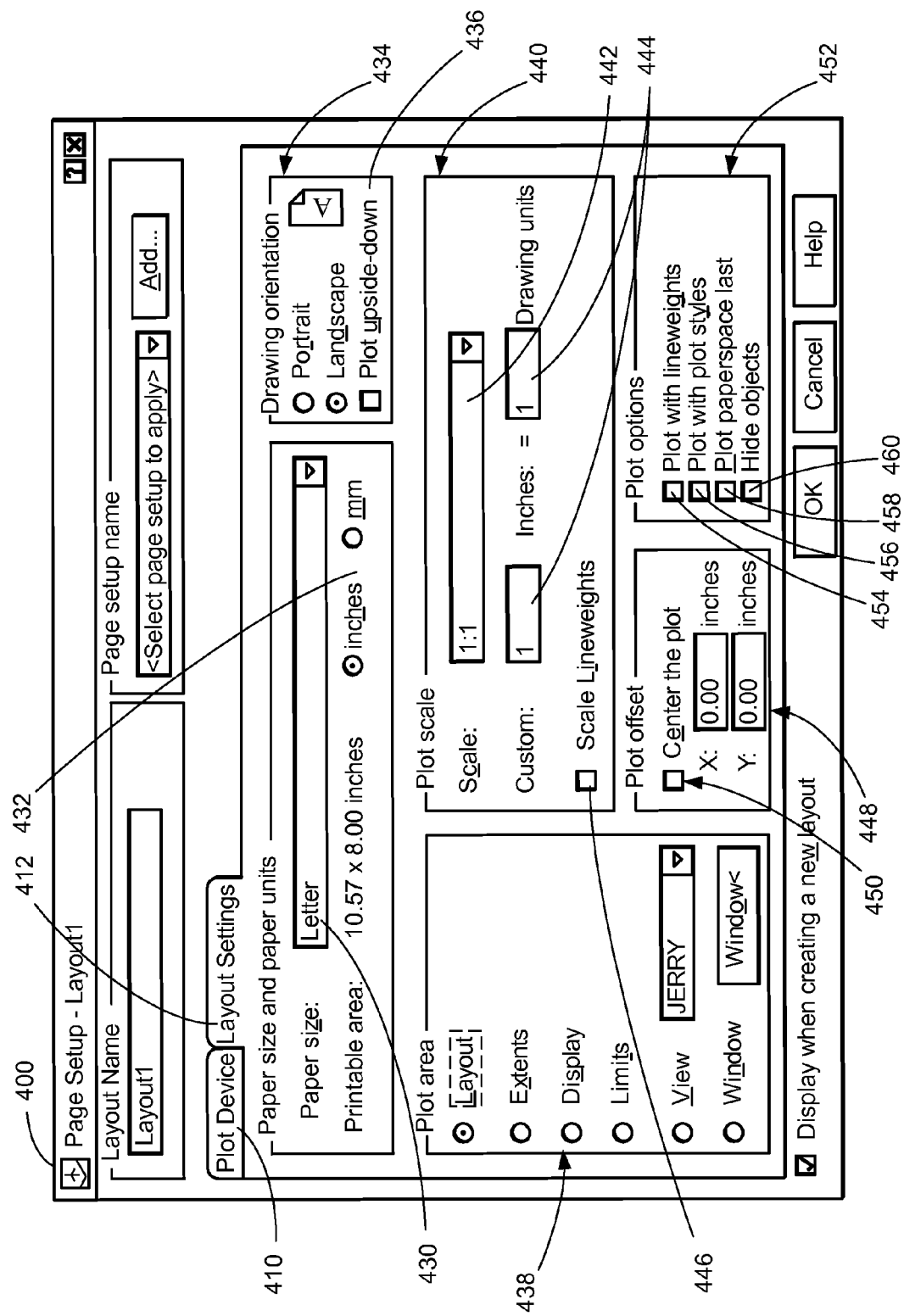

FIGS. 4A and 4B illustrate Page setup dialog 400. Page setup dialog 400 can be thought of as a property sheet for the layout. It contains most of the plot (also referred to as print) settings for the layout since the layout is a reflection of hard-copy output. In one or more embodiments, Page setup dialog 400 is accessible after selecting a file, layout or view. In accordance with one or more such embodiments, Page setup dialog 400 may be accessible/displayed using a "File" pulldown menu, a Layout toolbar, or a right-click popup menu (a menu display activated by right-clicking the mouse over a tab or an empty portion of the layout). In one or more embodiments, dialog 400 is displayed by default whenever a user creates a new layout or activates a layout tab for the first time. Users can control whether dialog 400 is automatically displayed by unchecking the "Display when creating new layout" checkbox 402, or through a checkbox in Options dialog activated by selecting Options button 424.

To activate Page setup dialog 400 using a command line (that may be available in a drawing or CAD program in accordance with one or more embodiments of the invention), a PAGESETUP command may be utilized.

Once Page setup dialog 400 is displayed, the user can select the appropriate output device (including "None) and settings. Page setup dialog 400 has two tabs 410 and 412. Tabs 410 and 412 contain most of the controls in the dialog, but unlike most tabbed dialogs, tabs 410 and 412 are not located at the top, but in the body of the dialog. At the top and bottom of the dialog are common controls that are accessible regardless of which tab is made current in the dialog. The common controls include the following:

Layout name (edit box) 404;

Page setup name (dropdown listbox and Add button) 406;

Display when creating new layout checkbox 402; and

OK, Cancel, Help buttons 408.

Layout Name 404

The Layout name control is an edit box and reflects the name of the current viewing mechanism or selection (e.g., whether the user is currently working on or has selected a layout or model). The viewing mechanism may be based on the current tab that the user has in the forefront of the workspace. For example, if the user is working on layouts for a drawing, a layout tab is selected and remains in the forefront of the workspace. Alternatively, if the user is working on a model for a drawing, the model tab is selected and remains in the forefront of the workspace. When dialog 400 is called from the Model tab, layout name 404 cannot be changed. However, when called from a layout tab layout name 404 can be changed by typing in a new name.

Page Setup Name 406

In accordance with one or more embodiments of the invention, page setups can be saved (named) and later restored allowing a single layout to be quickly plotted in different ways. For example, a user may want to set up the layout to plot 1:1 to an E size sheet of paper, as well as a 1:2 (half-size) to a C size sheet of paper and Scale to fit size to an A size sheet of paper. The user can set the values in the Page setup dialogs to these values, name the page setup, then reset them to other values and name that page setup, etc. When the drawing is ready to send to the plotter, the setup can quickly be restored and plotted. Thus, the selection of the settings may be performed by retrieving various Page setup names 406 that have been stored.

The Page setup name section 406 of Page setup dialog 400 contains a dropdown listbox and an Add button. In one or more embodiments, the dropdown listbox contains a list of previously saved named setups, as well as the names of the other layouts in the drawing. The dropdown list also contains a saved page setup of the last used (plotted) plot settings named *Previous*. The last successful plot settings may be stored in a registry and accessible by selecting the *Previous* item from the dropdown list. Any named setup can be made current by selecting from the list. When a named setup is selected, all the controls in the dialog update to reflect the saved settings. By default, the dropdown listbox displays *Current*. As described above, if the "None" output device is selected, the dropdown list may contain all available settings.

Figure 5:
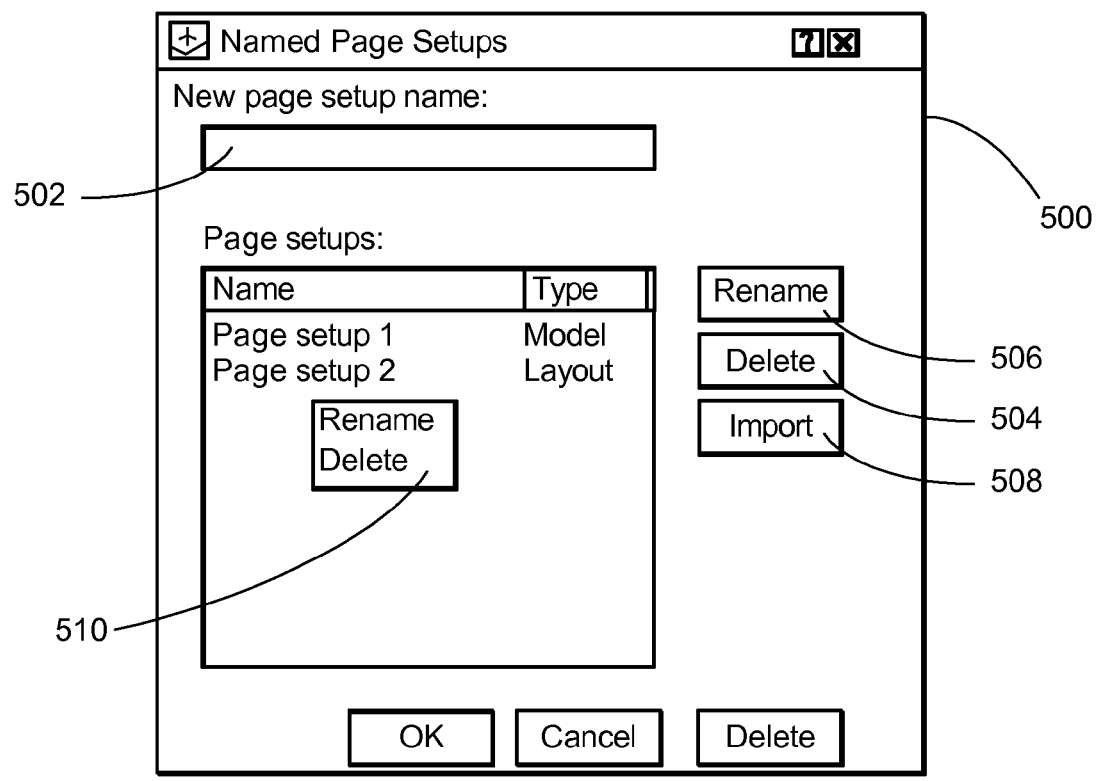
FIG. 5 illustrates a Named Page setup dialog in accordance with one or more embodiments of the invention.

To save the current page setup settings to a name, the Add button is pressed and the a dialog 500 of FIG. 5 is displayed. Typing a name into the New page setup name edit box 502 and pressing OK closes the dialog and creates a new setup with that name. The name is reflected as current in Page setup dialog 700. Users can also delete or rename existing named page setups from the Named Page setups dialog. A Named Page Setup can be deleted by selecting an item and pressing Delete button 504 or the Del key. Pressing Rename button 506 or F2, or selecting the item a second time while it is selected allows the named page setup to be edited in-place. Right-click while a named page setup is selected displays shortcut menu 510. Shortcut menu 510 has a Delete and Rename option.

Import button 508 allows importing named page setups from other drawings. After a named page setup is selected, if any of the Page setup controls are changed, the named page setup changes to *Current*. To update a named page setup, the user must resave the page setup under the same name by pressing the Add button, selecting the name, and pressing OK again.

Display When Creating New Layout Check Box 402

In the lower left corner of dialog 400 is a Display When Creating New Layout Check Box 402. By default, Page setup dialog 400 is displayed whenever an empty new Layout is made current for the first time. Layouts defined from templates are not affected by this check box. Users can disable the automatic display of Page setup dialog 400 by unchecking check box 402.

Plot Device and Layout Settings Tabs 410 and 412

Beneath Layout name 404 and Named Page setup 406 is a tabbed control (i.e., tabs 410 and 412) that allows the user to set the Print Device and Plot Settings: The tabbed control includes the following settings:

| Plot Device 410 | Layout Settings 412 |
| --- | --- |
| Printer Name (PC3, system printer, or "None") dropdown 414 | Paper size and Paper Units Paper size dropdown 430 |
| Properties button 416 | Printable area (static text) |
| Plotter (static text) | Inches, MM, Pixels radio buttons 432 |
| Where (static text) | Drawing orientation 434 |
| Description (static text) | Portrait or landscape radio buttons |
| Plot Styles 428 | Paper & orientation icon |
| Display plot styles checkbox 422 | Plot/Print upside checkbox 436 |
| Plot style table dropdown 418 | Plot area 438 |
| Plot style table editor button 420 | Layout, Display, Extents, Limits, View, & Window radio buttons |
| Options button 424 | View dropdown |
| | Window button |
| | Plot Scale 440 |
| | Standard dropdown 442 |
| | Custom edit boxes 444 |
| | Scale lineweights checkbox 446 |
| | Plot offset 448 |
| | X & Y offset edit boxes |
| | Center plot checkbox 450 |
| | Plot options 452 |
| | Plot with lineweights checkbox 454 |
| | Plot with plot styles checkbox 456 |
| | Plot paperspace last checkbox 458 |
| | Hide lines checkbox 460 |

The initial values in Page setup dialog 400 may be based on the Layout template chosen, a configured plotter/printer, or Options. Changes to any of the fields in the Paper Settings or Print Settings tab will be reflected in the current layout after Page setup dialog 400 is closed. For instance, changing either the paper size, print scale, print area, or print offset will change the size and location of the paper graphic in the layout relative to the geometry in the layout.

Plot Device Tab 410 of Page Setup Dialog 400 (FIG. 4A)

FIG. 4A illustrates Plot Device tab 410 of Page setup dialog 400. Plot Device tab 410 has controls for selecting a configured plotter 414, changing the properties of the selected plotter 416, assigning a plot style table 418, editing the plot style table 420, and controlling whether plot styles are displayed and printed in the Layout 422.

Pressing Options button 424 displays an Output tab of an Options dialog.

Plotter Configuration

The Plotter Configuration area 426 allows the selection of a plotter 414 and contains a button 416 to modify the properties of the plot device. The dropdown control 414 lists "None, the PC3 filenames, and the system printers available. An icon appears in front of the name (which helps identify whether it is a PC3 filename or system printer device). Printer selecton can also take place in a Plot dialog. The configured plotter/printer determines which paper sizes are available, so it is usually the first thing a user would set when setting up a layout. In one or more embodiments, when a plotter is selected that does not support the layout's selected paper size, a warning dialog is displayed and the plotter's default paper size is chosen. Alternatively, the plot device may be changed to "None" to accommodate the adjusted settings. The Device name (as described by the driver) is displayed beneath the Plotter Configuration name. The port it is configured for is displayed beneath the device name, and a user defined description is displayed beneath the port name.

Plot Styles 428

Plot Styles section 428 contains check box 422 that controls whether plot styles assigned to objects are displayed and plotted. A plot style table dropdown control 418 allows the user to select a plot style table to assign to the drawing. Plot style tables contain definitions of plot styles. To add or change the definition of a plot style name, the user can press Editor button 420 which displays a Plot style table editor.

Options 424

Options button 424 displays the Output tab of an Options dialog. Users can make changes to the Hardcopy options (e.g., number of copies, collate, number of pages to print, etc.).

Layout Settings Tab 412 of Page Setup Dialog 400 (FIG. 4B)

FIG. 4B illustrates Layout Settings tab 412 of Page setup dialog 400 in accordance with one or more embodiments of the invention. Layout Settings tab 412 controls the paper size, paper units, drawing orientation, plot area, scale, plot offset and plot options of the layout or model tab.

Paper Size 430

Paper size area 430 contains a dropdown list that allows selection of standard paper sizes. The dropdown list only contains paper sizes that are valid for the selected plotter. As described above, if the "None" output device/plotter is selected, the dropdown list will contain all known paper sizes. The dropdown list may also contain an icon that indicates the orientation of the media (how the paper is fed into the plotter or printer). In one or more embodiments of the invention, custom paper sizes are configured from a Properties dialog of the printer. In one or more embodiments of the invention, the dropdown list for graphics program drivers will list the available paper sizes using the following format:

An icon may be displayed as a visual indication of the media orientation (scalable task)

An ANSI, ISO, or Architectural designation will be indicated (i.e. A, A4, Arch D, etc.) for standard paper sizes.

The actual paper size will be shown indicating the width & height (i.e. 36"×24"). The width is interpreted as the X axis direction. For printers that know about media orientation, the paper size will be displayed for both orientations (i.e. one selection for 36"×24" and another selection for 24"×36").

Examples of paper sizes (a partial list) are shown below. In the dropdown list, the icon would also appear at the start of the text for each paper size.

| | |
| --- | --- |
| ANSI A (8.5 in × 11 in) | ISO A4 (210 mm × 297 mm) |
| ANSI A (11 in × 8.5 in) | ISO A4 (297 mm × 210 mm) |
| ANSI B (11 in × 17 in) | ISO A3 (297 mm × 420 mm) |
| ANSI B (17 in × 11 in) | ISO A3 (420 mm × 297 mm) |
| ANSI C (17 in × 22 in) | ISO A2 (420 mm × 594 mm) |
| ANSI C (22 in × 17 in) | ISO A2 (594 mm × 420 mm) |
| ANSI D (22 in × 34 in) | ISO A1 (594 mm × 841 mm) |
| ANSI D (34 in × 22 in) | ISO A1 (842 mm × 594 mm) |
| ANSI E (34 in × 44 in) | ISO A0 (841 mm × 1189 mm) |
| ANSI E (44 in × 34 in) | ISO A0 (1189 mm × 841 mm) |
| Arch D (24 × 36) | ISO B5 (182 mm × 237 mm) |
| Arch D (36 × 24) | ISO B5 (237 mm × 182 mm) |

-continued

| | |
|---|---|
| Arch E (36 × 48) | ISO B4 (250 mm × 354 mm) |
| Arch E (36 × 48) | ISO C5 (229 mm × 162 mm) |

If the printer does not have an understanding of the media orientation, it will be listed once. No media orientation icon will be displayed for the paper size selection. For system printers, the standard list of sheet size for the printer is displayed in the dropdown list as returned by the system printer. If no printer is selected (e.g., the "None" device is selected), a full list of standard paper sizes (ANSI, ISO, etc.) is presented and the user can also enter a custom paper size. When a user changes the printer for a layout, one or more embodiments of the invention choose the closest paper size supported by that printer available. This is a scalable task—users may be forced to configure at least one device before the dialog can be displayed. The Print Area text field displays the maximum printable area on the paper.

Paper Units 432

Paper units 432 indicates whether units are measured in inches, millimeters or pixels. The setting changes automatically based on the print devices and paper size selected, but can be changed manually by the user. The Pixels radio button is only displayed when configured for raster output. So when a user selects an A4 size sheet of paper, the units will default to mm, but when specifying an A sheet will default to inches. If a user wanted to print a drawing created in millimeters on an A size sheet, they could toggle the plot units to millimeters and the dialog would reflect the margins and paper size in millimeters instead of inches.

When configured for raster file output, the inches and mm radio button are hidden and the pixel radio button is automatically displayed and selected (because the drawing is being plotted to a specified pixel size).

Drawing Orientation 434

The Paper size 430 determines the size and orientation of the paper (how the paper is fed into the printer). For instance a printer may accept both a 22×34 or 34×22 inch sheet of paper. The icon always reflects the natural orientation of the paper as listed in the Paper size dropdown 430.

Drawing orientation 434 determines how geometry in the drawing is oriented on the sheet of paper, and is reflected by the letter A in the icon. The shape of the paper icon is determined by the natural orientation of the paper size chosen. Changing the orientation to Portrait or Landscape does not alter the shape of the icon, but instead rotates the letter A 90 degrees. Toggling the Plot upside-down check box 436 flips the letter A 180 degrees. By changing the drawing orientation (portrait & landscape) and the "Plot upside-down" check box 436, the user can achieve a 0, 90, 180, or 270 degree plot rotation.

Figure 6A:
FIGS. 6A and 6B illustrate the effect on an A icon when the orientation or Plot upside-down checkbox is modified.
Figure 6B:

FIGS. 6A and 6B illustrate the effect on the A icon when the orientation or Plot upside-down checkbox 436 is modified. FIG. 6A shows the effect of changing the orientations or checking Plot upside-down 436 when a natural portrait sized paper is selected (height greater than width i.e. 8.5× 11).

FIG. 6B show the effect of changing the orientations or checking Plot upside-down 436 when a natural landscape sized paper is selected (height greater than width i.e. 11×8.5):

The drawing orientation should not change when the different paper size is chosen. Thus, users no longer have to think about rotating a plot to achieve the desired orientation. They simply select the paper size and drawing orientation they want. Since the layout is WYSIWYG (What You See Is What You Get), there should be less confusion about how the drawing will appear when plotted.

Plot Upside-Down Checkbox 436

Plot upside-down check box 436 allows the drawing to be printed upside-down on the sheet of paper. The effect is similar to performing a plot rotation of 180 degrees. This is reflected in a print preview, but not in the layout tab (however the Paper shadow provides a visual que that the drawing will be printed upside-down). Users can also specify a plot rotation when printing from the command line to maintain script compatibility.

Plot Area 438

The Plot Area 438 (also referred to as Print Area 438) specifies the area of the drawing to be plotted/printed. The print area 438 is determined by selecting from a list of the following radio buttons on the left side of the dialog:

Layout
Extents
Display
Limits
View
Window

The Layout option prints everything that falls within the margins of the specified paper size with the origin being calculated from 0,0 coordinate location in the layout tab. The Layout option is disabled when printing from the Model tab.

The Display and Limits options are disabled when printing from a layout. The print origin is calculated as the lower left corner of the specified print area. The print offset shifts the origin.

A View must be selected from the View dropdown control before the radio button can be made active. Selecting a view automatically makes the radio button active.

The Window button must be pressed and a windowed area specified before the Window radio button can be made active, otherwise it is greyed out. Selecting the Window button dismisses the dialog temporarily allowing a windowed area in the drawing to be specified and the radio button is automatically made active. Once the Window button is selected, the prompt is:

Specify window for printing
Specify first corner:
Specify other corner:

Thereafter the user can switch between it and the other print area options by selecting the radio button.

Plot Scale 440

The plot area 438 specified is plotted at a scale set by the Scale controls 440. The default scale setting is 1:1 when printing from a layout. The default setting is "Scaled to Fit" when printing from the Model tab.

There are two controls for setting the scale of the layout, a dropdown edit box for standard scales 442, and edit boxes 444 for entering a custom scale. When a standard scale is selected, the scale is entered into the Custom edit boxes 444. A user can enter a custom scale by clicking in one of the edit boxes 444 and entering a custom scale into the edit boxes 444. If a custom scale is entered by keying in values in the edit boxes 444, the Standard dropdown control 442 changes to say "Custom".

The Standard dropdown list control 442 will contain a MRU (Most Recently Used) list. The four most recently used standard scales will appear at the top of the list. The list will be maintained in the registry. In one or more embodiments, metric scales are listed before architectural scales. One or more of the following scales are available in a standard scale dropdown list 442 in accordance with one or more embodiments of the invention.

| Scaled to Fit | 1:1 |
|---|---|
| 1/128" = 1' | 1:2 |
| 1/64" = 1' | 1:4 |
| 1/32" = 1' | 1:8 |
| 1/16" = 1' | 1:10 |
| 3/32" = 1' | 1:16 |
| 1/8" = 1' | 1:20 |
| 3/16" = 1' | 1:30 |
| 1/4" = 1' | 1:40 |
| 3/8" = 1' | 1:50 |
| 1/2" = 1' | 1:100 |
| 3/4" = 1' | 2:1 |
| 1" = 1' | 4:1 |
| 3" = 1' | 8:1 |
| 6" = 1' | 10:1 |
| 1' = 1' | 100:1 |
|  | 1000:1 |

Scale Lineweights Check Box 446

The Scale lineweight check box 446 controls the LWSCALE variable and whether lineweights are scaled proportionately with the plot scale. Normally lineweights specify the linewidth of plotted objects and are plotted with the linewidth size regardless of the plot scale. It is anticipated most users will plot 1 to 1 from a layout. However, if a user were to plot an E size layout that was scaled to fit on an A size sheet of paper, the user might want the lineweights to be scaled in proportion to the plot scale, similar to reducing the size of a copy sheet of paper on a Xerox machine. Checkbox 446 is unchecked and disabled for the Model tab.

Plot/Print Offset 448

The Print Offset 448 specifies an offset of the area selected for printing from the lower left corner of the media. When in a layout, the lower left corner of the printable area is displayed by the lower left margins. In other words, the lower left corner of the specified plot area will be positioned at the lower left margin of the paper. You can offset this origin by entering a positive or negative offset. Specifying an offset may cause the drawing to be clipped.

By changing the plot offset, the paper will appear to shift under the drawing. You can easily center the specified print area in the middle of the sheet by checking the Center plot check box 450.

Plot Options 452

Print lineweights (not shown in FIG. 4B)—allows the user to control whether lineweights are reflected when printing. Some users may wish to work in the layout or model tab with lineweights turned off, but still print with lineweights on.

Plot with lineweights 454—when checked, the drawing will plot with lineweights. Otherwise, the drawing will plot with 0 width lines (or whatever lines are assigned through plot styles if it is checked).

Plot with plot styles 456—when checked, the drawing will plot with the plotstyles assigned to the objects. Otherwise, the drawing will plot with whatever properties are assigned to the object (color, linetypes, lineweights, etc.).

Plot paperspace last 458—when checked, all geometry in paperspace viewports is plotted first, and the geometry in paperspace is plotted last. Otherwise, paperspace geometry is plotted first.

Hide line 460—forces the graphics program to perform a hide when printing the drawing. When printing a layout, this check box only affects paperspace geometry.

The following table summarizes the Page setup dialog 400 options that are available in accordance with one or more embodiments of the invention:

| Control | Comment | Shortcut |
|---|---|---|
| OK button 408 | Accepts all settings and starts a plot. When the plot is complete, the user is left back at the command prompt. | Enter |
| Cancel button 408 | Cancels any changes made, dismisses the plot dialog box and returns the user to the command prompt without creating a plot. | Escape |
| Help button 408 | Launches on line help. | H |
| Layout name edit box 404 | Displays the name of the current layout | N/A |
| Named Page setups dropdown 406 | This displays either "*Current*" if one layout is chosen to plot. It displays "Varies" if multiple tabs are selected to plot hat have different named setups. If they have the exact same name, it will say the name.<br>The dropdown list contains the names of all saved page setups in the drawing file. The user can choose one from the dropdown and have it apply to whichever tab(s) is/are selected for plotting.<br>When a named setup is chosen from the dropdown, the name of that setup is displayed in the dropdown until any changes are made in the dialog (except changes to the what to plot, number of copies or plot to file). Once a setting is changed in the dialog, the name in the Named Page setups dropdown changes to *Current*. | None |
| Add . . . button | Launches the Named Page setups dialog, where named setups can be created, deleted and/or renamed. | A |
| Plot Device and Plot Settings tab 410 and 412 | Select either tab to make their controls active (on top). They share the same tab stop - whichever one is on top gets accessed with a tab. The one that's below does not get accessed via a tab key. | None |
| Display when creating new layout checkbox 402 | Dialog is always displayed when creating a new layout if this is checked | F |
| Name drop down 414 | Displays pc3 files and shortcuts to pc3 files that reside in the plotter configuration directory and subdirectories of the configuration | N |

-continued

| Control | Comment | Shortcut |
|---|---|---|
| | directory, and displays all naked system printers. Whichever one is chosen is the pc3 file that will be plotted to when OK is selected. Icons are displayed next to all printers in this dropdown. There are two icons: one for naked system printers and one for pc3 files. When multiple layouts are selected to plot, the dropdown displays, "Varies". The user can drop the list down and choose another device, and that will change the device for all the layouts, and the dropdown will display the chosen pc3 file name. | |
| Plotter static text | Displays the plotter model name, driver tag line (HDI) or system plotter name and GDI driver name. | N/A |
| Where static text | Displays the local port name, the printer's Location string, network location or UNC name or "File" or "AutoSpool". | N/A |
| Description static text | Displays the description the user typed in the Description field for the selected PC3 file or it is exactly the same description that the user typed in the Description field of the Windows System Printer. | N/A |
| Properties . . . button 416 | When selected, displays the Plotter Configuration Editor for the device listed in the Name dropdown. If the device is a DWF file or naked system printer, the Custom Settings sub dialog is launched on top of the Plotter Configuration Editor. For more information on this behavior, see the Plotter Configuration Editor section of the specification.<br>When multiple layouts are selected to plot and the Name field says, "Varies," the Properties button is grayed out and the user can not select it.<br>When multiple layouts are selected to plot and the Name field reports anything other than "Varies," then the Properties . . . button is available. | R |
| Display Plot style checkbox 422 | Check to display plot styles | |
| Plot style table dropdown 418 | Specifies current plot style table for layout | |
| Editor button 420 | Launches plot style table editor dialog | |
| Options button 424 | Displays the Output tab of the Options dialog. | O |
| Paper Size drop down 430 | Displays the list of available paper sizes (including user defined) for the currently selected PC3 file. | Z |
| Printable area static text | Displays the printable area for the currently chosen paper size. | None |
| Inches radio button 432 | This control is hidden when the device is non-dimensional. When selected, indicates that the units of measurement for the paper are inches. The paper size chosen will automatically set this radio button if appropriate. The user can then override that setting if they choose. ANSI paper sizes generally use inches.<br>Most paper sizes will set this radio button correctly. Some system printer devices will not have automatically dimensionable paper sizes, in which case the inches radio button will be selected, and the user will need to change it if necessary.<br>This radio button affects the measurement of the Printable area and Offset calculation.<br>This control is hidden (not displayed to the user) if the selected plotting device does not support inches as a unit of measurement. | None |
| mm radio button 432 | This control is hidden when the device is non-dimensional. When selected, indicates that the units of measurement for the paper are mm. The paper size chosen will automatically set this radio button if appropriate. The user can then override that setting of they choose. ISO paper sizes generally use mm.<br>This radio button affects the measurement of the Printable area and Offset calculation.<br>This control is hidden (not displayed to the user) if the selected plotting device does not support mm as a unit of measurement. | None |
| Portrait radio button 434 | Indicates that the drawing will be placed on the paper in a portrait (vertical) orientation. | R |
| Landscape radio button 434 | Indicates that the drawing will be placed on the paper in a landscape (horizontal) orientation. | D |
| Plot upside-down check box 436 | Allows the drawing to be printed upside-down on the sheet of paper. The effect is similar to performing a plot rotation of 180 degrees. This is reflected in an print preview, but not in the layout tab (however the Paper shadow provides a visual cue that the drawing will be printed upside-down. | None |
| Orientation icon | This icon changes to indicate the orientation of the paper and the orientation of the drawing.<br>The paper part of the icon rotates based on the paper size and the upside down check box control<br>The Letter part of the icon rotates based on the Portrait and | None |

-continued

| Control | Comment | Shortcut |
|---|---|---|
| | Landscape radio buttons. | |
| | The default orientation is Landscape. | |
| Layout radio button 438 | Prints everything that falls within the margins of the specified paper size with the origin being calculated from 0,0 coordinate location in the layout tab. The Layout option is disabled when printing from the Model tab. | L |
| Extents radio button 438 | Prints everything that falls within the extents of the currently selected space.<br>This radio button is always available, unless there's nothing in the drawing. | T |
| Display radio button 438 | Prints everything that is in the current display, whether in a Layout or Model tab. If in a Layout, but the cursor is in an MS viewport, Display will plot everything that is displayed in the current layout - not only what is displayed within the MS viewport.<br>This button is grayed out when a layout is being plotted (it is only available when the current tab is Model). | S |
| Limits radio button 438 | Prints everything that is in the limits of the current space (Layout or Model).<br>This button is always available. | M |
| View radio button 438 | When selected, allows the user to choose a named view to plot.<br>This button is only available if there are saved views in the drawing. | V |
| View drop down 438 | The View button must be pressed and the view specified before the View radio button is enabled and made current, otherwise it greyed out. Thereafter the user can switch between the print area options.<br>This button is always available. | None |
| Window radio button 438 | The Window button must be pressed and the windowed area specified before the Window radio button is enabled and made current, otherwise it greyed out. Thereafter the user can switch between the print area options. This button is always available. | N |
| Window< button 438 | This button must be pressed to select a windowed area to print before the Window radio button is enabled. | None |
| Scale drop down 442 | The Standard dropdown list control will contain a MRU list. The four most recently used standard scales will appear at the top of the list. The list will be maintained in the registry. (Note: the contents of the list may be changed based on usability testing).<br>Scaled to Fit    1:1<br>$1/128" = 1'$    1:2<br>$1/64" = 1'$    1:4<br>$1/32" = 1'$    1:8<br>$1/16" = 1'$    1:10<br>$3/32" = 1'$    1:16<br>$1/8" = 1'$    1:20<br>$3/16" = 1'$    1:30<br>$1/4" = 1'$    1:40<br>$3/8" = 1'$    1:50<br>$1/2" = 1'$    1:100<br>$3/4" = 1'$    2:1<br>$1" = 1'$    4:1<br>$3" = 1'$    8:1<br>$6" = 1'$    10:1<br>$1' = 1'$    100:1 | C |
| Custom inches text entry 444 | The units in the drawing file. | None |
| Custom drawing units text entry 444 | The units value on the paper. In, mm or pixels are the units of measurement for this field. | None |
| Scale lineweights check box 446 | Scale lineweights—this controls the LWSCALE variable and whether lineweights are scaled proportionally with the plot scale. Normally lineweights specify the linewidth of plotted objects and are plotted with the linewidth size regardless of the plot scale. It is anticipated most users will plot 1 to 1 from a layout. However if a user were to plot an E size layout that was scaled to fit on an A size sheet of paper, the user might want the lineweights to be scaled in proportion to the plot scale, similar to reducing the size of copy sheet of paper on a Xerox machine. The checkbox is unchecked and disabled for the Model tab. | I |
| Center plot check box 450 | When checked, the plot is centered in the middle of the paper. | E |
| X offset text entry 448 | The Print Offset specifies an offset of the area selected for printing from the lower left corner of the media. When in a layout, the lower left corner of the printable area is displayed by the lower left margins. In other words, the lower left corner of the specified plot area will be positioned at the lower left margin of the paper. You can offset this origin by entering a positive or negative offset. Specifying an offset may cause the drawing to be clipped.<br>By changing the plot offset, the paper will appear to shift under the | None |

-continued

| Control | Comment | Shortcut |
|---|---|---|
| | drawing.<br>The units value on the paper. In, mm or pixels are the units of measurement for this field. | |
| Y offset text entry 448 | The Print Offset specifies an offset of the area selected for printing from the lower left corner of the of the media. When in a layout, the lower left corner of the printable area is displayed by the lower left margins. In other words, the lower left corner of the specified plot area will be positioned at the lower left margin of the paper. You can offset this origin by entering a positive or negative offset. Specifying an offset may cause the drawing to be clipped.<br>By changing the plot offset, the paper will appear to shift under the drawing.<br>The units value on the paper. In, mm or pixels are the units of measurement for this field. | None |
| Plot with lineweights check box 454 | When checked, objects plot with the lineweights they're assigned in the drawing file. | G |
| Plot with plot styles check box 456 | When checked, objects plot with the plot styles they're assigned in the drawing file.<br>*Note: For any property, such as a lineweight, is assigned in a plot style, the property in the plot style will always override the property assigned inside the drawing file. | Y |
| Plot paper space last check box 458 | When enabled, plots paper space objects after model space objects. | P |
| Hide objects check box (when in model tab) 460<br>Hide layout object check box (when in layout tab) 460 | Forces drawing program (e.g., AutoCAD) to perform a hide when printing the drawing. When printing a layout, only the objects in paper space will be hidden. This is reflected in a print preview, but not in the layout tab. | J |

Plotting/Printing

Figure 7A:
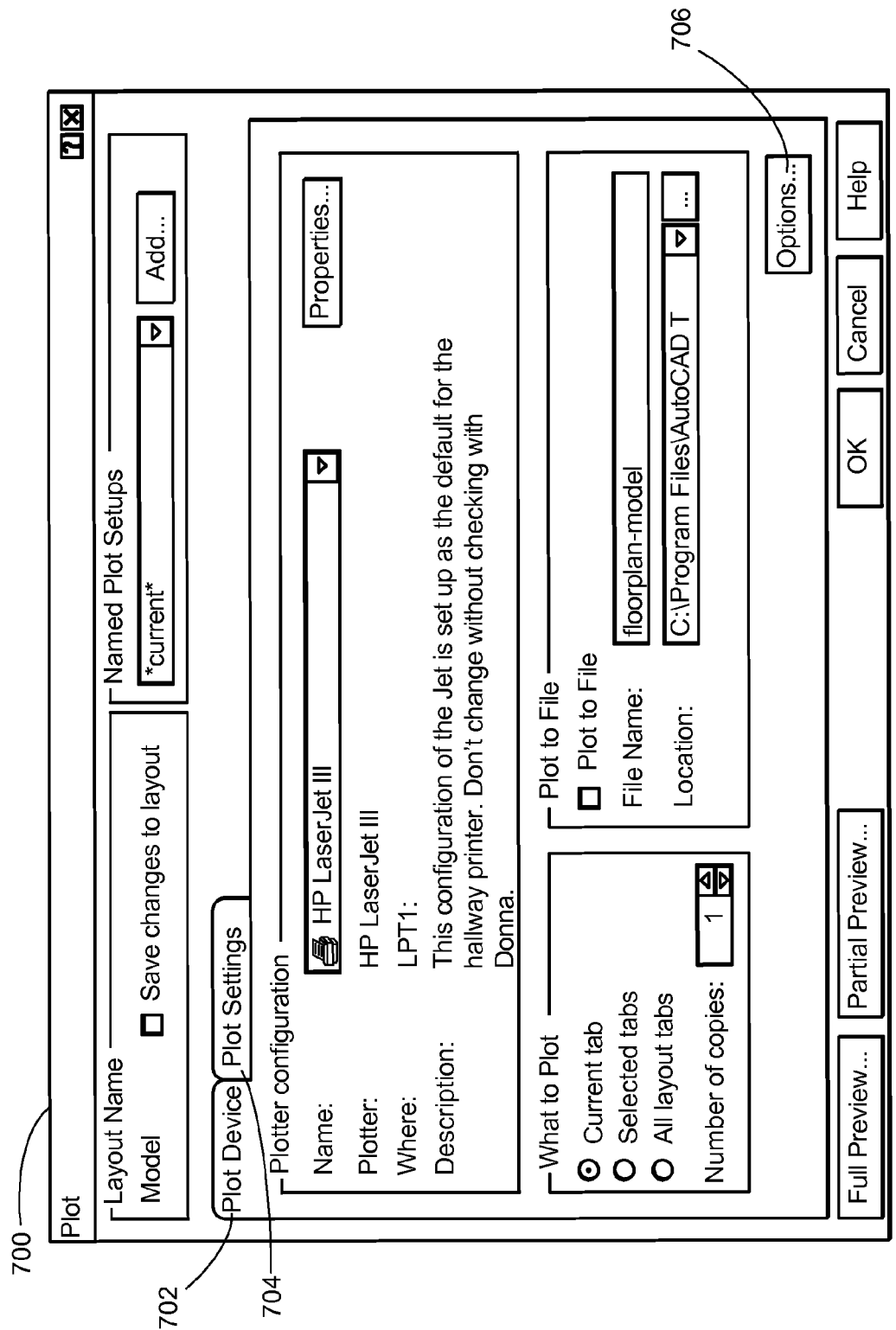
FIGS. 7A and 7B illustrate a Plot dialog in accordance with one or more embodiments of the invention.
Figure 7B:
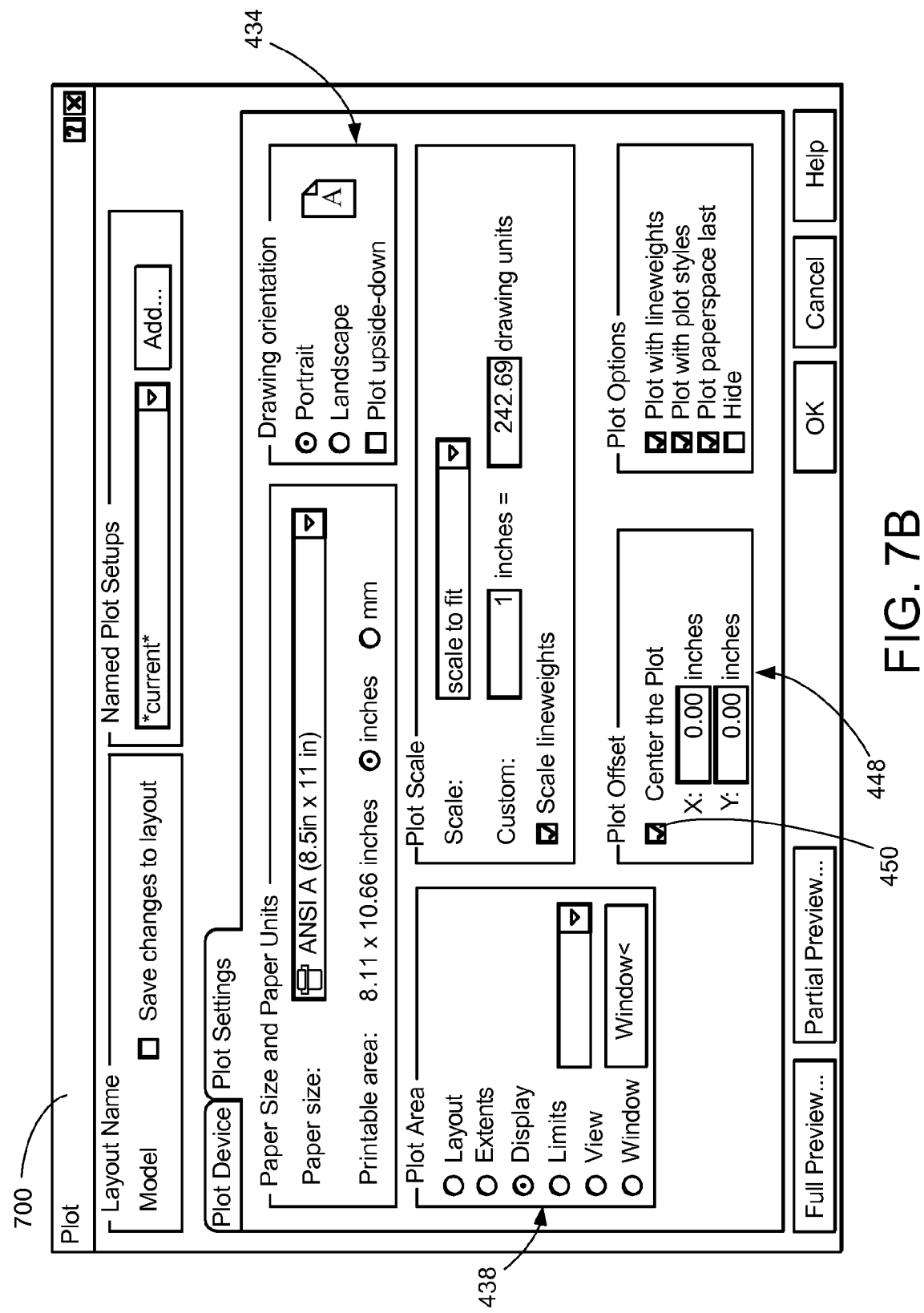

In accordance with one or more embodiments of the invention, a Plot Dialog may be utilized to provide for printing/plotting a drawing. In such an embodiment, the Plot Dialog may replace Page setup dialog 400 that is displayed. FIGS. 7A and 7B illustrate a Plot Dialog in accordance with one or more embodiments of the invention.

The user can access the Plot dialog 700 from a File pulldown menu, the Layout tab context menu, or the Standard toolbar. The Plot dialog 700 has two tabs 702 and 704 and looks very similar to the Page setup dialog. The primary difference is that it allows user to specify what to print (which layouts), how many copies, enter file and path name when plotting to a file, and includes a Full preview button. Users also have the ability to save changes made in the Plot dialog back to the layout.

Plot dialog 700 with the Plot device tab 702 active is shown in FIG. 7A. Plot dialog 700 with the Plot Settings tab 704 active is shown in FIG. 7B.

Plotting from the Layout Tab

The primary purpose of Layouts is to allow the user to easily set up their drawing for hardcopy output. Users may create many different layouts that each display different information about the same drawing. Each layout may contain different views, with different layers visible, at different scales, and setup to plot on different size sheets of paper.

Visual Clues for Layouts

The layout environment is designed to show a variety of visual clues that make it easy to set up a drawing for hardcopy output. Each layout has a specified paper size, margins, print offset, print scale, and print area (as described above). Most often the layout will be plotted 1:1 and fit on the specified sheet of paper, but there will be many cases where users wish to print a layout to a smaller media size, specify a different plot scale, or only print a portion of the geometry without having to create a new layout of alter the existing layout.

The paper size, margins and designated print area are all displayed in the layout. The paper size is reflected by a shadow-boxed border, and the margins by a dashed rectangle. The area outside the paper boundary is displayed with a gray color. Users should be able to turn off these visual cues as desired. When these visual cues are turned off, the entire drawing window is displayed in the background color of the paper (white by default).

If the sheet size, tide block, or any geometry is larger than the configured printer paper size, it will all still be displayed in paper space, but it should be obvious that the geometry in paper space won't fit on the paper when printed at a 1:1 scale. For instance, if the user changes to a smaller paper size (like letter size portrait), the shadow-boxed graphic of the paper size will change to reflect the newly chosen paper size. Likewise if the print scale changes (this is the scale for paper space, not floating viewports), the geometry will stay constant but the shadow-boxed graphic will change to reflect how it will look on the paper.

If a different printer is configured, the sheet size and margins will change to reflect the new configured printer. If a user wishes to print a layout that was originally set up for a D size sheet of paper to an A size portrait piece of paper, the user would also probably choose a print scale of "scaled to fit" and the paper size graphic would grow to enclose the geometry. The print scale would adjust accordingly. The viewport scale would no longer be accurate for the hardcopy output. Further, changing the paper orientation 434 from portrait to landscape in the Page setup dialog 400 (as described above) would rotate the plot 90 degrees.

The user is also able to shift the location of the layout to be printed by adjusting the print offset 448 (as described above). The 0,0 print origin is the lower left corner of the specified area and is located at the lower left corner of the margins of the paper. By entering positive values in the X and Y fields of the print offset, the plot is shifted up and/or to the right. Entering negative values shifts plot geometry down and to the left. Changing print offset 448 may result in the drawing being clipped if it is shifted too far in a given direction but will be clearly visible if the paper size and print margins are displayed. "Center print" checkbox 450 is available to easily center the drawing on the paper.

While many users will plot all the geometry in the layout that fits within the margins of the paper (by using the default setting—"Layout" from Plot Area 438), users are able to specify the plot area 438 which includes Extents, Limits, View, and Window (the "Display" option is disabled when plotting from a Layout tab). One or more embodiments of the invention displays a light gray rectangle around the designated plot area. If the specified plot area exceeds the sheet, some geometry will be clipped. If the specified area is smaller than the sheet size and excludes some geometry, then only the geometry within the specified area will be printed (i.e. window, view, limits when smaller than extents of geometry). In one or more embodiments of the invention, whenever the print area is re-specified in Page setup dialog 400, the print offset also changes.

The Visual clues for layouts (Display paper background, Display margins, Display print area, Display ruler) make it very easy to anticipate how a plot will look on a sheet of paper. The Print preview generates an even more accurate preview of the plot.

Plotting from the Model Tab

When the Plot command is entered while in model space, the Plot dialog (i.e., FIGS. 7A and 7B) will appear. Pressing OK will print the drawing using the Page setup (i.e., FIGS. 4A and 4B) settings applied to the Model tab. The default settings of the Model tab for new drawings are:

Print to configured printer (system printer)
Print the current display
Scale to fit
0 Rotation
0,0 offset The user can also apply the last used Plot settings to a new drawing, a new layout, or any uninitialized tab through activating an Options dialog by selecting button 706. All of the settings in the Page setup dialog (i.e., FIGS. 4A and 4B) apply when printing from the model tab in the same way as the layout tab. Users can plot the current drawing (Model tab), the current layout (Layout tab), or multiple tabs.

Description of Classes and Methods

Embodiments of the invention may be implemented using known object oriented programming techniques. In accordance with one or more embodiments of the invention, one or more of the following classes/methods may be utilized:

AcDbLayout Class

The AcDbLayout class will have these methods:
Acad::ErrorStatus getLayoutName(const char*&) const;
Acad::ErrorStatus setLayoutName(const char*);
These APIs allow the setting and retrieval of the user friendly names that are displayed in the tab control. Currently there is no restriction on the name, except for the length of the name. This is limited to 256 characters.

| int | getTabOrder( ) const; |
|---|---|
| void | setTabOrder(int); |

The tab order field controls the order in which the layouts are displayed in the tab control that is docked to the bottom of the viewport. The tab order should be unique and sequential among all layouts in the database.

| Adesk::Boolean | getTabSelected( ) const; |
|---|---|
| void | setTabSelected(Adesk::Boolean); |

This field controls whether or not the layout tab is included in the selection set for operations which affect multiple tabs. The user can perform multiple selection via the user interface by using the shift click metaphor.

Acad::ErrorStatus getPlotCfgName(const char*&) const;
Acad::ErrorStatus setPlotCfgName(const char*);
Specifies a .PC3 file containing the "how to plot" information.
Acad::ErrorStatus getPlotCfgOverride(const char*&) const;
Acad::ErrorStatus setPlotCfgOverride(const char*);
This field holds a string Containing all overrides to the plot configuration specified above.

Acad::ErrorStatus getPlotPaperMargins(double& xmin,double& ymin, double& xmax,double& ymax) const;
Acad::ErrorStatus setPlotPaperMargins(const double xmin,const double ymin, const double xmax,const double ymax);

Specifies the unprintable area of the configured paper. The print origin is offset from the edge of the paper by the margin specified here.

Acad::ErrorStatus getPlotPaperSize(double& width, double& height) const;
Acad::ErrorStatus setPlotpaperSize(const double width,const double height);

Specifies the width and height of the configured paper.
Acad::ErrorStatus getPlotPaperSizeDescription(const char*&) const;
Acad::ErrorStatus setPlotPaperSizeDescription(const char*);
Contains the localized name of the currently configured paper. This description is used in the Page setup dialog to describe the paper size configured.
Acad::ErrorStatus getPlotOrigin(double& x,double& y) const;
Acad::ErrorStatus setPlotOrigin(const double x,const double y);
Contains the plot origin offset which is applied inside of the paper margins.

```
enum PlotPaperUnits {
    kInches,
    kMillimeters,
    kPixels,
};
PlotPaperUnits  plotPaperUnits( ) const;
void            setPlotPaperUnits(const PlotPaperUnits);
```

The units determines the units under which the margins, offset and paper size are interpreted.

```
Adesk::Boolean  plotViewportBorders( ) const;
void            setPlotViewportBorders(Adesk::Boolean);
```

Specifies whether or not the floating model space viewport borders are plotted. Note that the viewport borders are always displayed on-screen during layout mode.

```
Adesk::Boolean  displayPenStyles( ) const;
void            setDisplayPenStyles(Adesk::Boolean);
```

Controls whether or not the object style is displayed during layout mode.
This setting does not affect the plotting of pen styles.

```
enum PlotRotation {
    k0degrees,
    k90degrees,
    k180degrees,
    k270degrees
};
PlotRotataion   plotRotation( ) const;
void            setPlotRotation(const PlotRotation);
```

Specifies the rotation of the plot on the paper.

```
Adesk::Boolean  plotCentered( ) const;
void            setPlotCentered(Adesk::Boolean);
```

If true, the paper margins are automatically computed to position the plot in the center of the sheet.

```
Adesk::Boolean  plotHidden( ) const;
void            setPlotHidden(Adesk::Boolean);
```

Controls whether or not the objects in paper space are processed through the hidden line algorithm. Note that this doesn't affect objects inside of floating model space viewports. A separate control, specified per viewport, controls hidden line removal within those viewports.

```
enum PlotType {
    kDisplay,
```

-continued

```
    kExtents,
    kLimits,
    kView,
    kWindow,
    kLayout
};
PlotType    plotType( ) const;
void        setPlotType(const PlotType);
```

Specifies what portion of the layout to plot onto the output media.

```
Acad::ErrorStatus getPlotWindowArea(double& xmin, double& ymin,
    double& xmax,double& ymax) const;
Acad::ErrorStatus setPlotWindowArea(const double xmin,const
    double ymin,const double xmax,const double ymax);
```

If a plot type of window is selected, then these coordinates define the portion of the layout to plot.
Acad::ErrorStatus    getPlotViewName(const    char*&) const;
Acad::ErrorStatus setPlotViewName(const char*);
If a plot type of view is selected, then this string specifies a named view that in turn specifies what portion of the layout to plot.

```
Adesk::Boolean  plotToScale( ) const;
void            setPlotToScale(Adesk::Boolean);
```

Controls whether or not the plot is performed to the scale defined below.
If not, each paperspace "unit" is equal to a "unit" on the plot device (could be millimeters, inches, or pixels).

```
Acad::ErrorStatus getPlotPaperScale(double& numerator,
    double& denominator) const;
Acad::ErrorStatus setPlotPaperScale(const double numerator,
    const double denominator);
```

Defines the scale of layout objects relative to the output sheet size.

```
Acad::ErrorStatus getViewportScaleDefault(double& numerator,
    double& denominator) const;
Acad::ErrorStatus setViewportScaleDefault(const double numerator,
    const double denominator);
```

Each floating model space viewport has its own scale factor defining how the relative size of objects in the viewport to the paper space objects. This value stores the initial default scale that viewports will be given when created.

Logical Flow of Software Embodiment

Figure 8:
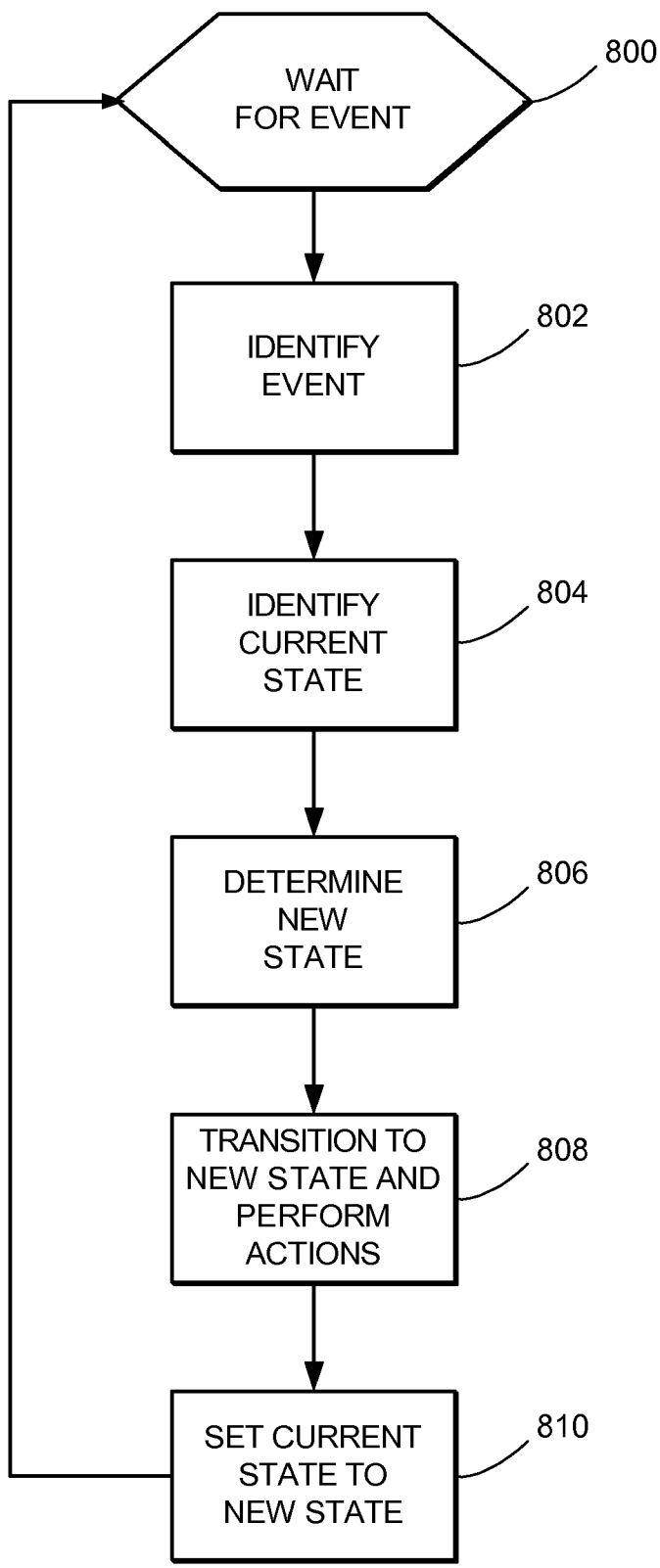
FIG. 8 is a flowchart that illustrates the general logic of a message or event-driven computer-implemented graphics program performing the steps of one or more embodiments of the invention.

FIG. 8 is a flowchart that illustrates the general logic of a message or event-driven program (such as graphics program 108) performing the steps in accordance with one or more embodiments of the invention. In such a program 108, operations are performed when transitions are made, based upon the receipt of messages or events, from present or current states to new states.

Generally, the flowchart begins by waiting at block 800 for an event (e.g., a mouse button click). It should be appreciated that, during this time, other operating system tasks, e.g., file, memory, and video tasks, etc., may also be carried out. When an event occurs, control passes to block 802 to identify the event. Based upon the event, as well as the current state of the program 108 determined in block 804, a new state is determined in block 806. In block 808, the logic transitions to the new state and performs any actions required for the transition. In block 810, the current state is set to the previously determined new state, and control returns to block 800 to wait for more input events.

The specific operations that are performed by block 808 when transitioning between states will vary depending upon the current state and the event. The various operations required to implement and maintain one or more embodiments of the invention represent particular events handled by the logic. However, it should be appreciated that these operations represent merely a subset of all of the events handled by the computer 100.

Figure 9:
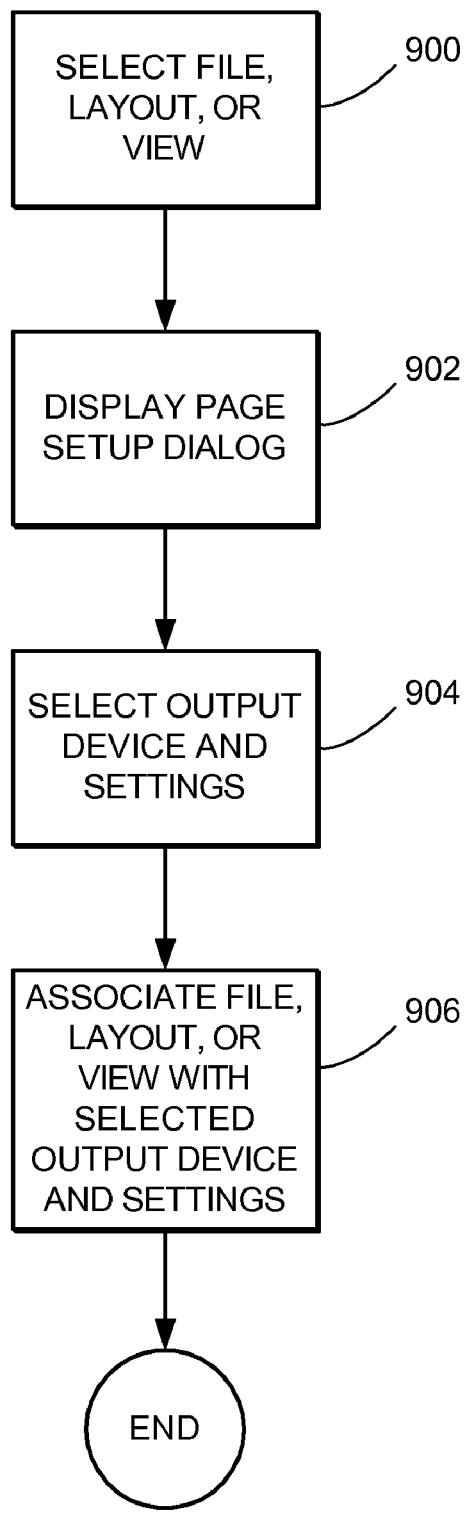
FIG. 9 is a flowchart that illustrates the association of one or more files, layouts, or views with multiple output devices in accordance with one or more embodiments of the invention.

FIG. 9 is a flowchart that illustrates the association of one or more files, layouts, or views with multiple output device configurations in accordance with one or more embodiments of the invention. At step 900, the desired file, layout, or view is selected by the user.

At step 902, a dialog box (e.g., Page setup dialog 400) is displayed to permit the user to modify any settings and make any selections desired. In one or more embodiments of the invention, the dialog box is displayed in response to a user electing to view the dialog box. In one or more alternative embodiments, the dialog box is automatically displayed upon selection of a file, layout or view. For example, when a new file or layout is created, the dialog box may automatically display to allow the user to adjust the various settings for the new file or layout. In accordance with one or more embodiments of the invention, a layout may contain any number of objects, entities, views, or viewports that may be output to a printer, plotter, monitor, or other output device.

At step 904, the desired output device (or output device configuration) and settings are selected by the user. Such user selection may be performed manually, item by item. Alternatively, the selection may be performed by a script (using any scripting language). At step 906, the selected output device (or output device configuration) and settings are associated with the file or layout. The association step 906 may be performed in a variety of manners. In one or more embodiments of the invention, the specified output device and all of the settings are stored in the file, layout, or view. In one or more alternate embodiments, the settings and output device configuration are stored in a library or dictionary, and a reference or link to the appropriate output device and settings are stored with the file, layout, or view. In yet another embodiment, the settings and output device configuration are stored in a library or dictionary along with a list of the files, layouts, or views associated with each setting. In such an embodiment, no reference to the output device and settings are stored with the file, layout, or view. In accordance with the invention, any mechanism may be utilized to associate the file, layout, or view with the selected output device and settings.

In accordance with one or more embodiments of the invention, the following table is an example of a partial listing of where and what settings may be saved in what location:

| Saved in drawing (per tab) | Saved in PC3 | Saved in registry | Saved in plot style table | Not saved |
| --- | --- | --- | --- | --- |
| PC3 name | Print device | Last successful plot settings | Definitions of style names | No of copies |
| Display plotstyles | I/O connection | Default PC3 file | | |
| Plot style table name | Media | Device overrides | | |
| Paper size (standard only) | Size (standard & custom) | | | |
| Plot orientation Portrait Landscape Upside-down | Source | | | |
| Plot Area | Margins | | | |
| Plot scale | Resolution | | | |
| Scale lineweights | Color depth | | | |
| Plot offset | Device memory | | | |
| Plot with linewght | Print quality | | | |
| Plot with plotstyle | Pen config | | | |
| Draworder of viewports | Custom settings | | | |
| Hide plot | Etc. - Hardcopy specification | | | |

Figure 10:
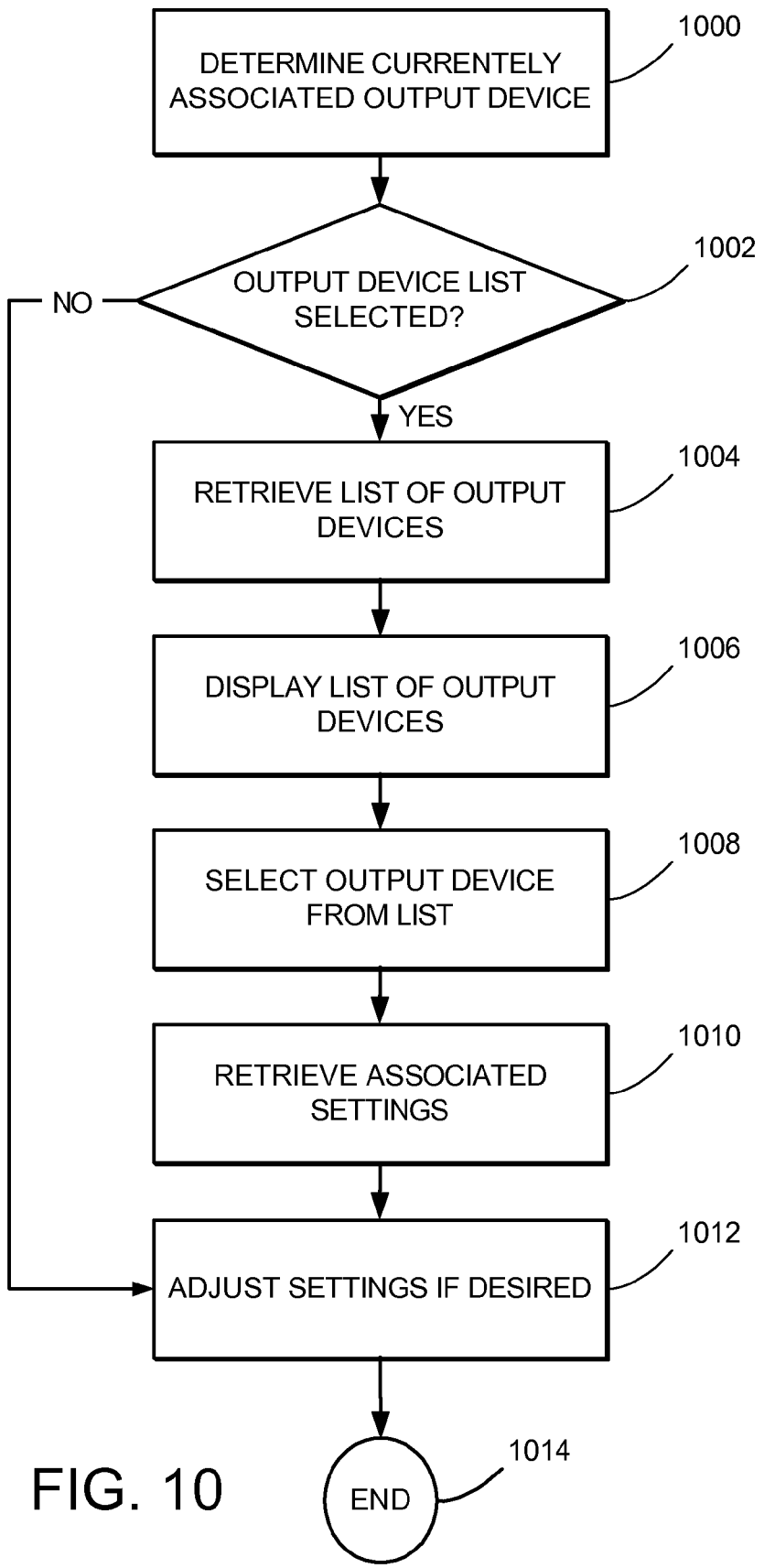
FIG. 10 is a flow chart illustrating the logic flow of displaying and selecting output devices and settings in accordance with one or more embodiments of the invention.

FIG. 10 is a flow chart further illustrating the logic flow of displaying and selecting output devices and settings (e.g., steps 902 and 904) in accordance with one or more embodiments of the invention. Once a user indicates a desire to modify settings including the output device (e.g., by electing to view a page setup dialog box), one or more embodiments determine the currently associated output device configuration at step 1000.

At step 1002, a determination is made as to whether or not the user elects to view the list of available output device configurations (e.g., by selecting a dropdown or combo box displayed). If not, the user can adjust any other settings displayed if desired at step 1012. If the user selects the output device combo box, one or more embodiments of the invention retrieve the list of output device configurations at step 1004. The list may be retrieved from the system (e.g., by retrieving all of the device names using system available commands (or object methods in an object oriented programming environment)).

At step 1006, the retrieved list of output device configurations is displayed to the user. At step 1008, the user may select an output device configuration from the list. In one or more embodiments, the currently selected output device configuration is the default selection and is highlighted in the list. At step 1010, any settings associated with the output device configuration selected are retrieved (e.g., multiple output trays of a printer or different page sizes). At step 1012, any of the settings are adjusted, if desired by the user. The process is complete at step 1014.

Conclusion

This concludes the description of one or more embodiments of the invention. The following describes some alternative embodiments for accomplishing the present invention.

For example, any type of computer, such as a mainframe, minicomputer, work station or personal computer, could be used with the present invention. In addition, any program, function, or operating system could benefit from the present invention.

In summary, the present invention discloses a method, apparatus, and article of manufacture for providing configuring and associating one or more files, layouts, or views with one or more output device configurations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for associating multiple output devices with a drawing in a computer-aided design (CAD) application comprising:
    selecting a first layout of said drawing in the CAD application, wherein said first layout comprises a first view of said drawing;
    selecting a first output device;
    selecting a first output device configuration;
    associating, within said drawing, said first layout with said first output device and said first output device configuration;
    selecting a second layout of said drawing in the CAD application, wherein said second layout comprises a second view of said drawing;
    selecting a second output device;
    selecting a second output device configuration;
    associating, within said drawing, said second layout with said second output device and said second output device configuration.

2. The method of claim 1 wherein said first and second output device selection steps and said first and second output device configuration steps are performed in a page setup dialog.

3. The method of claim 1 wherein said first and second output device selection steps and said first and second output device configuration steps are performed by scripting.

4. The method of claim 1 wherein said association steps comprise:
    saving a name for said first output device with said drawing;
    saving a name for said second output device with said drawing;
    saving said first output device configuration with said drawing;
    saving said second output device configuration with said drawing;
    saving first additional configuration information with said first output device; and
    saving second additional configuration information with said second output device.

5. An apparatus for associating multiple output devices with a drawing in a computer-implemented graphics program comprising:
    (a) a computer having a memory;
    (b) a computer aided design (CAD) application executing on the computer, wherein the CAD application is configured to:
        (i) select a first layout of said drawing, wherein said first layout comprises a first view of said drawing;
        (ii) select a first output device;
        (iii) select a first output device configuration;
        (iv) associate, within said drawing, said first layout with said first output device and said first output device configuration;
        (v) select a second layout of said drawing, wherein said second layout comprises a second view of said drawing;
        (vi) select a second output device;
        (vii) select a second output device configuration;
        (viii) associate, within said drawing, said second layout with said second output device and said second output device configuration.

6. The apparatus of claim 5 wherein said computer graphics program is further configure to display a page setup dialog that enables the selection of the first and second output devices and the first and second output device configurations.

7. The apparatus of claim 5 wherein the computer graphics program is configured to select the first and second output devices and the first and second output device configurations by scripting.

8. The apparatus of claim 5 wherein said computer graphics program is configured to associate by:
    saving a name for said first output device with said drawing;
    saving a name for said second output device with said drawing;
    saving said first output device configuration with said drawing;
    saving said second output device configuration with said drawing;
    saving first additional configuration information with said first output device; and
    saving second additional configuration information with said second output device.

9. An article of manufacture comprising a program storage device embodying instructions that, when executed by a computer, cause the computer to perform a method for associating multiple output devices with a drawing in a computer-aided design (CAD) application in a computer, comprising:
- selecting a first layout of said drawing, wherein said first layout comprises a first view of said drawing;
- selecting a first output device;
- selecting a first output device configuration;
- associating, within said drawing, said first layout with said first output device and said first output device configuration;
- selecting a second layout of said drawing, wherein said second layout comprises a second view of said drawing;
- selecting a second output device;
- selecting a second output device configuration;
- associating, within said drawing, said second layout with said second output device and said second output device configuration.

10. The article of manufacture of claim 9 wherein said selecting of said first and second output devices and said first and second output device configurations are performed in a page setup dialog.

11. The article of manufacture of claim 9 wherein said selecting of said first and second output devices and said first and second output device configurations are performed by scripting.

12. The article of manufacture of claim 9 wherein said associating comprises:
- saving a name for said first output device with said drawing;
- saving a name for said second output device with said drawing;
- saving said first output device configuration with said drawing;
- saving said second output device configuration with said drawing;
- saving first additional configuration information with said first output device; and
- saving second additional configuration information with said second output device.

* * * * *